United States Patent

[11] 3,617,133

[72] Inventor Carman H. Gibson
  Rte. 4, Fayetteville, Tenn. 37334
[21] Appl. No. 39,600
[22] Filed May 20, 1970
[45] Patented Nov. 2, 1971

[54] MICROINCH-MEASURING INSTRUMENTATION SYSTEM
  3 Claims, 2 Drawing Figs.
[52] U.S. Cl. .................................................. 356/159,
  250/210, 250/219 S
[51] Int. Cl. ..................................................... G01b 11/08,
  G01b 11/10
[50] Field of Search .......................................... 250/210,
  219 S; 356/159

[56] References Cited
  UNITED STATES PATENTS
  2,065,365 12/1936 Doyle et al. .................... 250/210
  3,452,209 6/1969 Melkonjan et al. ............. 250/219 S
  3,178,995 4/1965 Hartman ......................... 356/159
  FOREIGN PATENTS
  375,936 4/1964 Switzerland ..................... 250/219 S Primary Examiner—Ronald L. Wibert
Assistant Examiner—R. J. Webster
Attorneys—Harry M. Saragovitz, Edward J. Kelly and Herbert Berl ABSTRACT: Device for microinch measurement of the diameter of a continuous length of wire wherein the diameter of the test wire is compared against the diameter of a standard wire by utilizing a light and a dual-element light-sensitive detector. The test wire is placed between the light and the first light-sensitive detector while the standard wire is placed between the light and the second light-sensitive detector. The light-sensitive detectors are connected in a balanced bridge such that a deviation in wire size of the test wire causes the unbalanced bridge to provide an output indicative of the difference between the size of the test wire and the standard wire. The amount of imbalance is correlated to the dimension of the wire and may be visually displayed or recorded.

Carman H. Gibson,
INVENTOR

MICROINCH-MEASURING INSTRUMENTATION SYSTEM

DEDICATORY PARAGRAPH

The invention described herein may be manufactured, used, and licensed by or for the Government for governmental purposes without the payment to me of any royalty thereon.

BACKGROUND OF THE INVENTION

There is a need for a device which can measure and record on a continuous basis, a very small diameter insulated guidance signal wire employed in some guided missile systems. The nominal diameter of the wire is specified as 0.0063 inches plus or minus 0.0001 inch. Deviations from a nominal diameter within this range of plus or minus 0.000050 inches are permitted within a 50,000 foot supply spool, except for specified lengths the diameter may very as much as plus or minus 0.000070 inches. These dimensions are critical to the successful operation of the guided missile and must be maintained during the production processes.

Prior efforts to develop a measuring system for this wire have been unsuccessful. In one type, amplifier drift was a problem, sensitivity was marginal for the resolution desired, and mechanical instability inherent in the design rendered it entirely too sensitive to the outside influences of temperature change, shock, and vibration. Another system employed a mechanical contact device which drives a strain transducer through a pair of precision ball bearings rolling on opposite sides of the moving wire strand. Errors were introduced by bearing runout, temperature fluctuations, vibrations, and other disturbances. Sensitivity was lost through heavy damping introduced in an attempt to attenuate the noise effects.

Accordingly, it is an object of this invention to provide a measuring and instrumentation device which can measure and record physical dimensions down to and including 1 microinch.

Another object of this invention is to provide a measuring and instrumentation device which can continuously measure and record physical dimensions of an item of infinite length, such as a wire, a cable, a string, or a rope.

Another object of this invention is to provide a device which can measure slots, embossments, hole diameters, or other convolutions.

Yet another object of this invention is to provide a device which is stable and simple.

SUMMARY OF THE INVENTION

A dual-element detector is uniformly illuminated by a colluminated light source. A wire having a known dimension is placed between the light source and a first detector element while a wire having an unknown dimension is placed between the light source and a second detector element. The detector elements are connected into a bridge network which, after calibration, provides an output voltage indicative of the difference between the standardized wire and the unknown wire diameters. The output from the bridge circuit is thus correlatable to the actual diameter of the unknown wire. The values of the resistors in the bridge network and the operating point of the detector elements are chosen to provide a self-compensating circuit for light intensity changes.

DESCRIPTION OF THE PREFERRED EMBODIMENT

Figure 1:
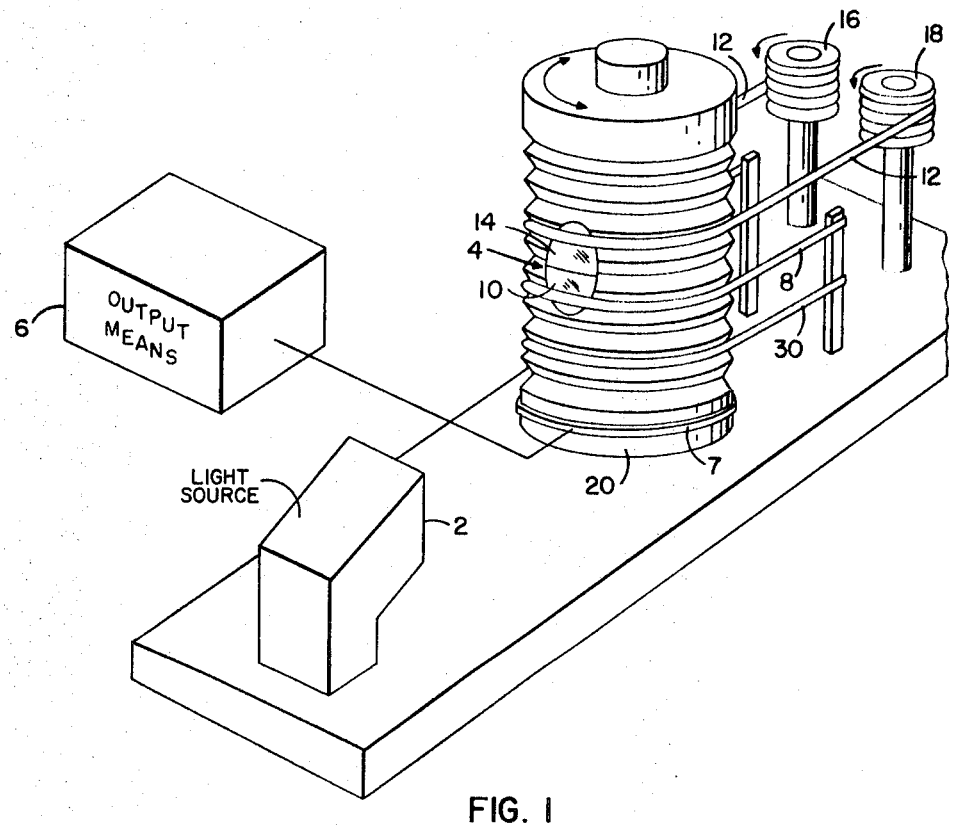
FIG. 1 is a perspective view of the present invention.

Referring to FIG. 1, colluminated light source 2 is positioned to evenly illuminate dual-element light detector 4. Detector 4 is connected to output means 6 via sliprings 7. Standardized test specimen, wire 8, is positioned between light source 2 and element 10 of detector 4. Another test wire, 8 is positioned between light source 2 and element 14 of detector 4.

The present invention may be used to monitor the diameter of wire 12 as wire 12 is pulled from reel 16 onto reel 18. Threads in guide 20 maintain wire 12 in exact position as the wire moves. Output means 6 may take the form of a recorder to thereby provide a complete record of the diameter of the entire reel of wire. The diameter of the wire may thus be checked for accuracy and, should the diameter vary outside prescribed tolerances, the exact length at which the error occurs may be determined from the position on the time axis of the recorder vs length of wire measured.

Figure 2:
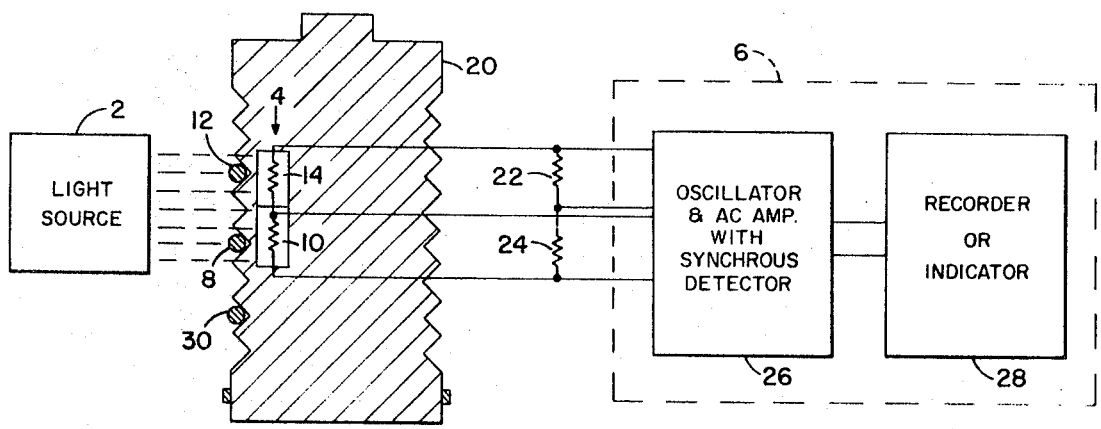
FIG. 2 is a schematic diagram of the present invention with a sectional view of the adjustment means disclosing the light-sensitive element therein.

Referring to FIG. 2, wires 12 and 8 are shown positioned in threads in wire guide 20. Light source 2 is positioned such that both elements of dual-element light-sensitive detector 4 receive the same illumination. Light source 2 may be colluminated to provide uniform illumination of the detector elements. The exact exposure of detector elements 14 and 10 is determined by the size of the object placed between the light source and the particular element. Thus, the diameter of the wire is sensed by the detector. The output of the detector element is indicative of the diameter of wires 8 and 12.

To increase the stability of the device, the light-sensitive detector 4 is mounted in wire guide 20 so that the wire is closely positioned to the detector. The threads on the guide are placed to position the wires 8 and 12 exactly between the light source and their respective light-sensitive element. The wire guide may be made large to provide added inertia to increase stability. The light and the wire guide including the light detector are securely affixed to a chassis to provide stability. A cyanide-treated and chromium-plated guide has proven to be durable. The simple arrangement of the elements of the present invention provides a device which offers stability not offered by any known wire-measuring device. The novel arrangement offers a device which is unaffected by temperature variations or light intensity variations. All the elements of the present invention offer instantaneous response which is very important when it is being used to measure a length of wire.

Resistors 22 and 24 are connected to form a bridge network with detector elements 10 and 14. When wires 8 and 12 have the same diameter, the output of the bridge circuit is zero. The value of the bridge completion resistors 22 and 24 and the operating point of detector 4 are selected to make a self-compensating circuit for light intensity changes. This eliminates the need for a precision regulated light source and minimizes errors introduced by fluctuations in the light source intensity. As the intensity of the light source decreases the resistance of the detector increases causing the sensitivity of the circuit to increase. The reverse is true for an increase in light intensity. There is no "zero" shift in the output since the output from the bridge network is based on the difference between the individual detector element outputs.

The output of the bridge circuit (detector elements 10 and 14, and resistors 22 and 24) is connected to output means 6. The output from the bridge circuit may be connected directly to a recorder. Certain detectors have been used which provide a bridge output of 20 millivolts with a 100 microinch change in wire diameter. Numerous output schemes may be devised to best utilize the output from the bridge circuit and correlate the output to the actual wire diameter of the wire to be measured. In certain environments where noise is a problem, a carrier output network may be used to advantage. FIG. 2 discloses such an output network. An alternating current oscillator is used to energize the bridge circuit. The output from the bridge circuit is amplified with a narrow band-pass amplifier and detected with a synchronous demodulator. The output from the oscillator and AC amplifier with synchronous detector 26 is connected to recorder or indicator 28. The recorded or indicated value is then correlated to the absolute diameter of wire 12. T The device may be calibrated by substituting wires of known diameter for the wire to be measured. The amplifier gain and zero are adjusted at this time to standardize the system to an absolute value. FIG. 1 discloses a novel means for a quick calibration check. Wires 30 and 8 are standardized wire having a guaranteed known diameter. These wires are used to calibrate the device. The wires are positioned to rest in threads on guide 20. As the guide is rotated, the position of wires 12, 8 and 30 move in a vertical plane. Thus, wire 12 may be moved out of alignment with detector elements 14 and 10, respectively. This adjustment is simple and quickly executed, making calibration for the particular wire size expedient.

The present invention may be used in a wide variety of precision measurement applications where comparison against a known standard is possible. Some examples in addition to those already disclosed would be the measurement of the diameter of holes of any shape, clearances between mating parts, sizes of small parts such as ball bearings, or thicknesses of sheet material.

I claim:

1. In a wire diameter measuring device having, a light detector means with dual elements, a light source positioned to uniformly illuminate both elements of said light detecting means, and a means for detecting and registering differential output between said elements of said light-detecting means, guide means comprising:

a relatively large diameter cylindrical member,
   a helical thread of V-shaped cross section formed on the outer surface of said cylindrical member,
   said light-detecting means being mounted within an opening in the outer surface of said cylindrical member with the elements thereof being in alignment with the bottoms of two adjacent threads.
   means for guiding the wire to be measured around said cylindrical member in the thread groove adjacent one element of said light-detecting means, and
   a reference wire of known thickness trained around said cylindrical member in the thread groove adjacent the other element of said light-detecting means.

2. A wire diameter measuring device as set forth in claim 1 wherein, said light detecting means is press-fitted into said cylindrical member.

3. A wire diameter measuring device as set forth in claim 2 wherein, said cylindrical member is rotatably mounted, and wherein an additional reference wire of slightly different diameter is provided in the thread groove next adjacent to that occupied by the other reference wire, whereby rotation of said cylindrical member in the proper direction will move either the two reference wires into a position with said light-detecting elements for calibrating the equipment or one reference wire and the test specimen into opposition with said light-detecting elements for measurement of the diameter of the test specimen.

* * * * *